Sept. 28, 1943.                R. AUCHTER                 2,330,539
                                CATALYST
                         Filed June 4, 1938          2 Sheets-Sheet 1
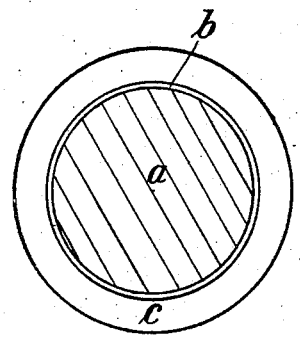
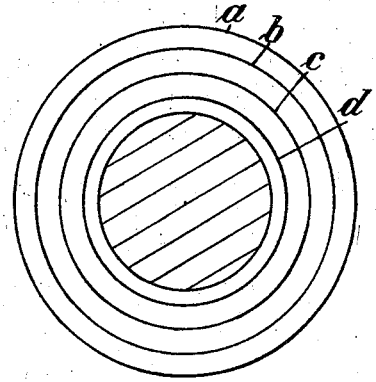
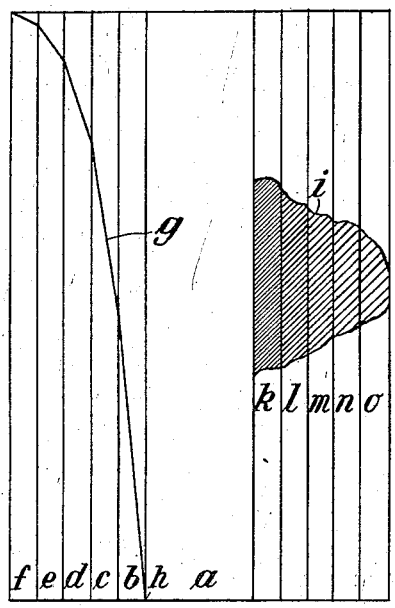
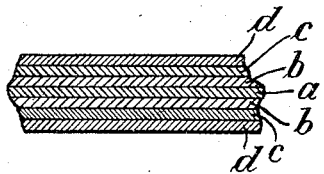
Ruland Auchter
Inventor:

Sept. 28, 1943.    R. AUCHTER    2,330,539
CATALYST
Filed June 4, 1938    2 Sheets-Sheet 2

Inventor:
Ruland Auchter
By Otto Munk
his Atty.

UNITED STATES PATENT OFFICE 2,330,539

CATALYST

Ruland Auchter, Konigsbach in Baden, Germany; vested in the Alien Property Custodian Application June 4, 1938, Serial No. 211,789
In Germany June 7, 1937

4 Claims. (Cl. 252—234)

The present invention relates to catalysts containing platinum or platinum alloys in the form of thin wires woven into fine mesh gauzes or the like.

Catalysts of this type are known in the art as useful for the catalytic oxidation of ammonia to nitric acid and for similar purposes as described for instance in U. S. Patent No. 1,978,198.

It has been observed that practically all of the catalytic materials suitable for the purposes mentioned are, in different degrees, subject to a gradual mechanical disintegration caused by the chemical reaction which occurs owing to the presence of the catalysts. As a consequence of this disintegration which proceeds from the outer surface towards the core of the catalyst wires, during an extended period of use of the catalyst, a very considerable loss of precious metal takes place and results in a gradual reduction and eventually in a complete cessation of catalytic activity.

Some alloys combine with a relatively high catalytic efficiency a relatively great resistance to mechanical disintegration. However these latter alloys are difficult to start.

One object of the present invention is to produce a catalyst which is easily started, but offers a high resistance to mechanical disintegration so that the loss of precious metal is considerably smaller and the length of time during which the catalyst operates efficiently is substantially greater than with the catalysts used heretofore.

Another object of the invention is to produce a multi-layer catalyst which is easily started and reaches its maximum efficiency in a very short time.

Still another object of the invention is to produce a multi-layer catalyst which is easy to be started and has a high maximum efficiency and in which all of the layers remain catalytically active during the entire reaction period of the catalyst.

A still further object of the invention is to provide a multi-layer catalyst in which each outer layer is of a kind to more easily initiate a chemical reaction than the next following inner layer and serves to speed up the activation of the latter which in turn has a higher catalytic efficiency.

Applicant found that each catalytic material reaches its maximum efficiency, when the loosening of the crystals has proceeded from the outer surface to a certain depth, while further disintegration does not bring about any increase of efficiency, but, on the contrary, results in a gradual reduction of the catalytic efficiency owing to the increasing loss of catalytic material.

Applicant found further, that, in a catalyst having several layers connected firmly together by heat merged bonds, the disintegration of an outer layer of a material that is easily started and has a relatively small maximum efficiency, will proceed only very slowly beyond the maximum efficiency stage, if the innermost crystals of such outer layer are bonded at the depth where the maximum efficiency of the outer layer is attained, to the outermost crystals of an inner layer having a greater resistance against disintegration and a higher catalytic efficiency and being less easily started. Moreover, the innermost crystals of an outer layer which are disposed at the depth where the maximum efficiency of such outer layer is attained and are at this depth firmly connected by heat merged bonds to the outermost crystals of an inner layer are particularly adapted and capable of starting the catalytic activity of such inner layer.

Based on these discoveries, the above mentioned objects are accomplished by the new catalysts set forth in the following description, defined in the appended claims and illustratively exemplified in the accompanying drawings in which Fig. 1 is a cross-section through a catalyst wire according to a first embodiment of the invention.

Fig. 2 is a cross-section of a catalyst wire according to a second embodiment of the invention.

Fig. 3 is a longitudinal section of a multi-layer catalyst wire with a disintegration curve and a mechanical resistance curve being added.

Fig. 4 is a cross-section through a multi-layer catalyst foil constructed according to the invention.

Figures 5, 5A:
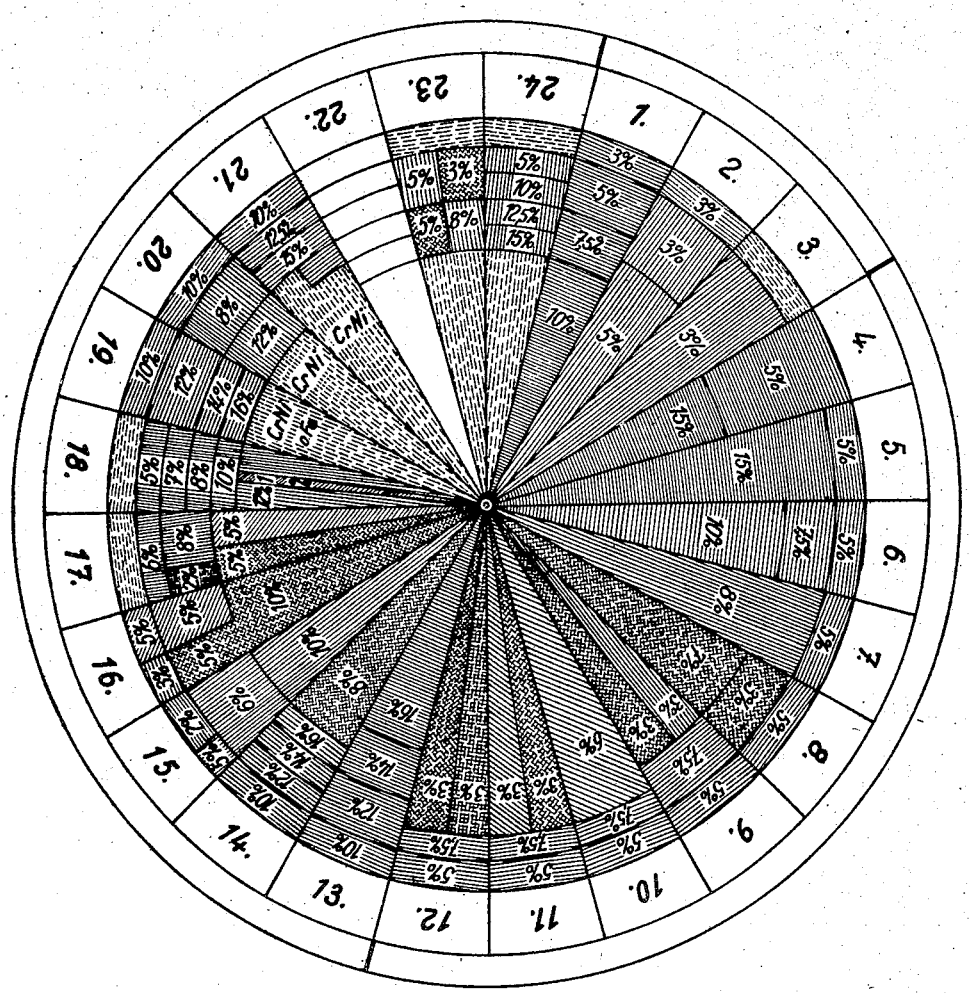
Fig. 5 is a cross-sectional view of a catalyst wire composed of 24 different sectors, illustrating and representing 23 examples of catalyst wire according to the invention.
Fig. 5a is a key for Fig. 5.

Referring now to the drawings and first to Figure 1, $a$ denotes a metallic core consisting of an alloy which offers a high resistance to disintegration caused by catalytic reaction. The alloy from which the core is formed may have, for instance, a high melting point which prevents it from being chemically attacked at the ordinary working temperatures of the catalytic reaction, or it may contain a quantity of catalytically inactive components. A casing $c$ of a catalytic metal, for instance platinum or a platinum alloy, which is easier to start than the alloy forming the core $a$, surrounds the latter.

The casing is applied to the core, for instance by galvanization and subsequent forging at a high temperature preferably exceeding 1000° C. It is also possible to weld a thin metal sheet around the rough core and to roll the resulting multi-layer wire. Temperatures are used at which the metal of the casing is at least soft, up to temperatures where this metal is in the liquid state. As a result of this heat treatment, the crystals of the outer casing combine intimately with the crystals of the core in a heat merged bond. Instead of one casing, several catalytically active casings may be applied one on top of the other in the manner described. Owing to the heat merged bond, a diffusion of the outermost crystals of the core $a$ with the innermost crystals of the casing $c$ takes place in the zone $b$. As a result, the casing $c$ is anchored firmly on the core $a$ and will remain solidly supported by the core even after the crystals of the casing have become partly loosened.

Moreover, in contradistinction to activating platinum layers which have been applied heretofore by galvanization alone or by painting with platinum chloride the outermost layer which is firmly anchored on its support by the heat merged bonds according to the invention, will not volatilize during the initial stages of the reaction and remains active during the entire service period of the catalyst. On the other hand, the intimate connection between the easily started and highly active casing $c$ and the core $a$ which is less easily started and has a greater resistance against disintegration, causes at least a portion of the core $a$ to participate in the catalytic action of the casing.

Fig. 2 illustrates a catalyst wire having an outer peripheral surface $a$ and a core and several catalytic casings surrounding the core and one another and merging into one another on lines $b$, $c$ and $d$. In the course of a reaction period, the outermost casing between lines $a$ and $b$ is first started. When the crystals of this layer adjacent line $b$ have become activated, the second casing between lines $b$ and $c$ is drawn into the reaction. As the reaction proceeds, the latter casing, in turn, activates the third casing between $c$ and $d$ and so on, each inner casing consists of a catalytic material more difficult to start and of greater maximum catalytic efficiency and greater resistance to deterioration than the next following outer layer, but the core may be made from a material which is catalytically inactive.

According to Fig. 3, a catalytically inactive core $a$ having an outer surface $h$ is enclosed in five casings $b$, $c$, $d$, $e$ and $f$. The line $g$ which represents the disintegration curve flattens out gradually towards the surface $h$, the alloys of the different casings being so selected that the resistance offered to the loosening of the crystals, for instance along the line $i$, increases gradually from casing to casing inwardly, and as the crystals of the different layers become successively loosened, the whole laminated structure is firmly anchored on and supported by the core $a$.

Fig. 4 illustrates a laminated catalytic foil having a central layer $a$ covered on opposite surfaces with successive catalytic layers $b$, $c$ and $d$.

The shaded sectors of Fig. 5 illustrate different examples, respectively, of catalytic wire constructed according to the invention. As indicated by the key Fig. 5a the different shadings indicate the presence of the following materials: rhodium, ruthenium, osmium, platinum, iridium, palladium, silicon, and chrome-nickel. Wherever per cent figures are inscribed into sector zones in Fig. 5, it is to be understood that the layers represented by such zones consist of an alloy of platinum with the element indicated by the shading, the latter being present in the percentage given.

The total diameter of a catalytic wire as represented by the different sectors of Fig. 5 may be 0.06 mm., but a core of 0.04 mm. diameter generally does not participate in the catalytic action. According to the invention, the catalytically active outer portion of the wire, which has a thickness of 0.01 mm., is divided into several concentric zones of different composition. If, as shown in Example 24, the catalytically active wire portion is equally subdivided into five concentric zones, each zone will have a thickness of 0.002 mm.

Sectors 1 to 3 of Fig. 5 illustratively exemplify catalyst wires for use in reactions carried out at relatively low temperatures up to 680°.

The wire according to Example 1 comprises an outermost layer having a thickness of 0.002 mm. and consisting of a platinum alloy containing 3% rhodium. This layer, owing to its low rhodium content, is easily started, but subject to a relatively rapid disintegration. In the next following layer which has a thickness of 0.004 mm., the rhodium content of the platinum alloy is increased to 5%. This second layer has a correspondingly higher resistance to disintegration and is less easily started than the outermost layer. The third layer is 0.004 mm. thick and contains 7.5% rhodium and the core consists of a platinum alloy containing 10% rhodium.

The third layer offers a very considerable resistance to catalytic activation and disintegration and the core is practically catalytically inactive.

In Example 2, the outermost layer has the same thickness and composition as in Example 1, but the next following layer is 0.006 mm. thick and consists of a platinum alloy containing 3% ruthenium, while the core has a diameter of 0.044 mm. and consists of an alloy of platinum with 5% ruthenium.

According to Example 3 an outermost layer of 0.002 mm. thickness consists of pure platinum and serves to excite a core of 0.056 mm. diameter consisting of a platinum alloy containing 3% ruthenium.

Examples 4 to 12 illustrate catalyst wires adapted for reactions carried out at temperatures between 680° C. and 780° C.

A catalyst wire according to Example 4 comprises a core having a diameter of 0.04 mm. The core consists of a platinum alloy containing 15% rhodium and having a high reaction resistance and a high melting point. An outer casing having a thickness of 0.01 mm. and consisting of a platinum alloy containing 5% rhodium surrounds the core and is connected thereto by heat merged bonds. A catalyst wire net made with wire of this type and used in an ammonia converting plant reached its maximum yield after 14 days' service.

In the wire according to Example 5, the core also contains 15% rhodium, but in this case its diameter is 0.056 mm., while the thickness of the outer casing consisting of a platinum alloy containing 5% rhodium is reduced to 0.002 mm. It was found that the core, in spite of its high rhodium content, participated to some extent in the catalytic action, after having been started by the outer casing at a certain stage of the reaction period.

According to Example 6 the outermost layer is 0.002 mm. thick and the platinum alloy of this layer contains 5% rhodium. The next following layer is 0.004 mm. thick and consists of a platinum alloy with 7.5% rhodium, while the core has a diameter of 0.048 mm. and is made of a platinum alloy containing 10% rhodium.

The wire of Example 7 has an outer layer of 0.002 mm. thickness. This layer consists of platinum alloyed with 5% rhodium and merging directly into the surface of a core of 0.056 mm. diameter consisting of a platinum alloy containing 8% ruthenium.

Each of Examples 8 to 12 refers to a catalyst wire having an outermost layer of the same dimensions and composition as that of the wire of Example 7.

However, according to Example 8 a second layer, which is 0.004 mm. thick consists of platinum alloyed with 3% iridium and a core of 0.048 mm. diameter consists of a platinum alloy with 7% iridium.

In the wire of Example 9, the second layer and the core have the same dimensions as in Example 8, but the second layer consists of platinum alloyed with 7.5% rhodium and the core consists of a platinum alloy containing 3% ruthenium and 3% iridium.

In Examples 10, 11 and 12 the thickness of the second layer is only 0.002 mm. and this layer consists of platinum alloyed with 7.5% rhodium. In each of Examples 10 to 12 the core has a diameter of 0.052 mm.

According to Example 10 the core consists of a platinum alloy containing 6% silicon, according to Example 11 the core consists of platinum alloyed with 3% silicon, and 3% iridium and in Example 12 the platinum alloy of the core contains 3% palladium and 3% iridium.

Examples 13 to 21 refer to catalyst wires for relatively heavy duty in ammonia converting plants operating at high temperatures.

Example 13 shows a wire comprising a core and three successive casings all consisting of platinum rhodium alloys, the rhodium content in the alloy of the outermost casing being 10% and increasing gradually inwardly.

Example 14 refers to a wire having four reaction casings consisting of platinum rhodium alloys, the rhodium content of the alloy of each inner casing being greater than that of the alloy in the next following outer casing. Each casing is 0.002 mm. thick and the innermost casing is mounted on a core of 0.048 mm. diameter and consisting of a platinum alloy containing 8% iridium.

Examples 15 and 16 refer to multi-layer wires in which the different layers contain a low percentage of rhodium or no rhodium at all and the proper inwardly increasing resistance to disintegration is attained by using suitable alloys of platinum with other metals such as ruthenium and osmium.

Examples 17 and 18 refer to wires without rhodium. In these cases inner layers containing platinum alloys free of rhodium and having an inwardly increasing resistance against disintegration are excited by outer casings consisting of pure platinum.

According to Examples 19 to 21 reaction casings of different platinum rhodium alloys are combined with cores consisting of non-precious metal alloys as for instance chrome-nickel. As indicated in Example 16, under certain circumstances, the core may be made from a chrome-nickel alloy containing iron.

Examples 23 and 24 show wires comprising an outer casing of pure platinum, several intermediate reaction layers consisting of platinum alloys free of rhodium and a core consisting of a non-precious metal alloy.

I claim:

1. An active platinum catalyst comprising a wire gauze, each of the wires of said gauze comprising a plurality of layers of material, the layer of material next adjacent the surface comprising a catalytically active platinum alloy of crystalline structure and the outer layer comprising a material selected from the group consisting of platinum and the platinum alloys which initiate chemical reactions more easily and have less resistance to disintegration than the platinum alloy of said inner layer, the outer layer being of such thickness that the innermost crystals of said outer layer are disposed at a depth to which the reaction penetrates and the crystals of the outer layer are loosened when the catalyst has been initially activated to a maximum efficiency, said innermost crystals and the outermost crystals of the first mentioned layer being interlaced and connected by heat merged bonds with the outermost crystals of said inner layer so that after the catalyst has been activated the crystals of the outermost layer will be supported by the crystals of the inner layer.

2. An active platinum catalyst wire comprising an inner circumferential layer of a catalytically active platinum alloy of crystalline structure, and an outer circumferential layer of a crystalline catalytic material selected from the group consisting of platinum and the platinum alloys which are more easily activated and have a smaller resistance to disintegration than the platinum alloy of said inner layer, said outer layer having a thickness of the order of .002 mm. and having been heat merged with the inner layer at a temperature exceeding 1000 degrees C. and below the melting point of said outer layer so that a bond is produced between said inner and outer layers capable of inhibiting loss of said outer layer after activation and consequent loosening of the crystals thereof.

3. A composite platinum rhodium catalyst wire comprising a laminated mass of several successive circumferential layers, the outer layer comprising a crystalline catalytic material selected from the group consisting of platinum and platinum-rhodium alloys containing a minor proportion of rhodium, each successive layer towards the center of said laminated mass having a relatively large proportion of rhodium as compared to each layer immediately outward therefrom so that outer layers of said mass will be more easily activated and the inner layers of said mass will be more resistant to disintegration, all of the layers of said mass having been homogeneously heat merged by forging after assembly at temperatures above 1000 degrees C. and below the melting point thereof.

4. An active platinum catalyst wire comprising a plurality of circumferential layers of material, the layer of material next adjacent the surface comprising a catalytically active platinum alloy of crystalline structure and the outer layer comprising a material selected from the group consisting of platinum and the platinum alloys which initiate chemical reactions more easily and have less resistance to disintegration than the platinum alloy of said inner layer, the outer layer being of such thickness that the innermost crystals of said outer layer are disposed at a depth to which the reaction penetrates and the crystals of the outer layer are loosened when the catalyst has been initially activated to a maximum efficiency, said innermost crystals and the outermost crystals of the first mentioned layer being interlaced and connected by heat merged bonds with the outermost crystals of said inner layer so that after the catalyst has been activated the crystals of the outermost layer will be supported by the crystals of the inner layer.

RULAND AUCHTER.